US010983580B2

(12) United States Patent
Mizuno et al.

(10) Patent No.: US 10,983,580 B2
(45) Date of Patent: Apr. 20, 2021

(54) COMPUTER SYSTEM AND ELECTRIC POWER CONTROL METHOD FOR COMPUTER SYSTEM

(71) Applicant: HITACHI, LTD., Tokyo (JP)

(72) Inventors: Makio Mizuno, Tokyo (JP); Masanori Takada, Tokyo (JP)

(73) Assignee: HITACHI, LTD., Tokyo (JP)

( * ) Notice: Subject to any disclaimer, the term of this patent is extended or adjusted under 35 U.S.C. 154(b) by 121 days.

(21) Appl. No.: 16/330,794

(22) PCT Filed: Feb. 24, 2017

(86) PCT No.: PCT/JP2017/007020
§ 371 (c)(1),
(2) Date: Mar. 6, 2019

(87) PCT Pub. No.: WO2018/154699
PCT Pub. Date: Aug. 30, 2018

(65) Prior Publication Data
US 2019/0250693 A1 Aug. 15, 2019

(51) Int. Cl.
*G06F 1/3234* (2019.01)
*G06F 3/06* (2006.01)
(Continued)

(52) U.S. Cl.
CPC .............. *G06F 1/3234* (2013.01); *G06F 1/32* (2013.01); *G06F 3/06* (2013.01); *G06F 3/067* (2013.01);
(Continued)

(58) Field of Classification Search
CPC .... G06F 1/3234; G06F 3/0625; G06F 3/3559; G06F 3/0659; G06F 3/0664; G06F 9/46; G06F 9/50
See application file for complete search history.

(56) References Cited

U.S. PATENT DOCUMENTS 9,158,578 B1 * 10/2015 Derbeko ............. G06F 12/0842
2006/0190745 A1 * 8/2006 Matsushima ......... G06F 1/3203
713/300
(Continued)

FOREIGN PATENT DOCUMENTS

JP 2011-013764 A 1/2011

OTHER PUBLICATIONS

International Search Report (with English Translation) and Written Opinion for PCT/JP2017/007020 dated Apr. 11, 2017.

*Primary Examiner* — Jaweed A Abbaszadeh
*Assistant Examiner* — Hyun Soo Kim
(74) *Attorney, Agent, or Firm* — Mattingly & Malur, PC

(57) ABSTRACT

Computer components, such as processors and storage devices, provide a performance and consumes an electric power within a range of an upper limit performance and an upper limit power consumption of a power state set for the component among a plurality of power states corresponding to a type of the component. A processor unit determines whether a budget power as a power consumption permitted for a target computer is equal to or more than a power consumption of the target computer or not. When the determination result is false, for at least one component of the target computer, the processor unit selects a power state based on at least one of a priority of an operation using the component and a data characteristic corresponding to the component among a plurality of types of power states corresponding to a type of the component as power state of the component.

13 Claims, 11 Drawing Sheets

(51) Int. Cl.
    *G06F 9/46*       (2006.01)
    *G06F 9/50*       (2006.01)
    *G06F 1/32*       (2019.01)

(52) U.S. Cl.
    CPC .......... *G06F 3/0625* (2013.01); *G06F 3/0659* (2013.01); *G06F 3/0664* (2013.01); *G06F 9/46* (2013.01); *G06F 9/50* (2013.01); *Y02D 10/00* (2018.01)

(56) References Cited

U.S. PATENT DOCUMENTS

| | | | |
|---|---|---|---|
| 2007/0067657 A1* | 3/2007 | Ranganathan | G06F 1/3268 713/320 |
| 2008/0263373 A1* | 10/2008 | Meier | G06F 9/3017 713/300 |
| 2009/0271648 A1* | 10/2009 | Ushijima | G06F 1/3203 713/324 |
| 2011/0246639 A1* | 10/2011 | Feder | G06F 1/3296 709/224 |
| 2011/0316338 A1* | 12/2011 | Peterson | G06F 1/3206 307/29 |
| 2016/0162018 A1* | 6/2016 | Rahardjo | G06F 1/26 713/323 |

\* cited by examiner

FIG. 8

OPERATING STATE MANAGING TABLE 810

| COMPONENT # | COMPONENT NAME | POWER STATE | USED TIME | OPERATION # |
|---|---|---|---|---|
| 1 | MP1 | LP1 | 2h | 1.2 |
| 2 | SSD1 | Normal | 2h | 1.2 |
| 3 | SSD2 | Normal | 6h | 3 |
| 4 | SSD3 | Normal | 4h | 4 |

Column labels: 820, 830, 840, 850, 860

FIG. 9

COMPONENT CHARACTERISTIC TABLE 910

| TYPE NAME | POWER STATE | PERFORMANCE | POWER CONSUMPTION |
|---|---|---|---|
| MP | Normal | 100% | 80W |
| MP | LP1 | 80% | 60W |
| MP | LP2 | 50% | 40W |
| SSD | Normal | 100% | 24W |
| SSD | LP1 | 50% | 13W |
| SSD | LP2 | 25% | 7W |

Column labels: 920, 930, 940, 950

FIG. 10

REQUIRED ELECTRIC ENERGY TABLE 1010

| COMPONENT # | COMPONENT NAME | REQUIRED PERFORMANCE | REQUIRED POWER STATE | POWER CONSUMPTION | OPERATION # |
|---|---|---|---|---|---|
| 1 | MP1 | 70% | LP1 | 60W | 1,2 |
| 2 | SSD1 | 90% | Normal | 80W | 1,2 |
| 3 | SSD2 | 25% | LP2 | 7W | 3 |
| 4 | SSD3 | 70% | LP1 | 60W | 4 |

FIG. 11

OPERATION PRIORITY MANAGING TABLE 1110

| OPERATION # | PRIORITY | USED COMPONENT LIST |
|---|---|---|
| 1 | HIGH | MP1,SSD1 |
| 2 | HIGH | MP2,SSD2 |
| 3 | LOW | MP1,SSD2 |
| 4 | LOW | MP1,SSD3 |

FIG. 12

OPERATING RATE MANAGING TABLE 1200

| COMPONENT # | COMPONENT NAME | OPERATING RATE | OPERATING RATE THRESHOLD | EXCEEDED COUNT | COUNT THRESHOLD | ELAPSED TIME [s] | TIME THRESHOLD [s] | ADJUSTMENT TARGET |
|---|---|---|---|---|---|---|---|---|
| 1 | MP1 | 60% | 90% | 1 | 5 | 0.3 | 1 | No |
| 2 | SSD1 | 75% | 80% | 5 | 5 | 1 | 1 | Yes |
| 3 | SSD2 | 20% | 60% | 0 | 5 | 0 | 1 | No |
| 4 | SSD3 | 30% | 60% | 0 | 5 | 0 | 1 | No |

DATA CHARACTERISTIC MANAGING TABLE 1300

| COMPONENT # | LUN | START ADDRESS | END ADDRESS | VM NAME | CHARACTERISTIC NAME |
|---|---|---|---|---|---|
| 2 | 1 | 0x00100000 | 0x00200000 | VW11 | Original |
| 2 | 2 | 0x00200000 | 0x00300000 | VW12 | Original |
| 3 | 3 | 0x01000000 | 0x01010000 | — | Copy |
| 4 | 4 | 0x08000000 | 0x09000000 | — | Copy |

1310 1320 1330 1340 1350 1360

COMPUTER SYSTEM AND ELECTRIC POWER CONTROL METHOD FOR COMPUTER SYSTEM

TECHNICAL FIELD

The present invention generally relates to an electric power control of a computer system.

BACKGROUND ART

Recently, there has been known a computer system that includes a plurality of general-purpose computers that each executes both a server virtual machine (VM) and a storage VM. The server VM operates as a server unit that issues an I/O request. The storage VM operates as a storage unit that executes the I/O in response to the I/O request. Such a computer system is hereinafter referred to as "hyper-converged system." The hyper-converged system mainly has features, such as a low hardware cost when it is in a small scale and requiring less hardware types.

The computer system is generally housed in a data center. Specifically, in the data center, typically a plurality of racks house the computer systems in which server units (hereinafter referred to as server), storage units (hereinafter referred to as storage), and network units (hereinafter referred to as network) each plurally exist. The server unit performs a calculation process. The storage unit stores data for performing the calculation process. The network unit couples the server with the storage.

Usually, the maximum electric power is preset for a whole or a part of the range of the data center. Typically, when it is attempted to support a peak of all the resources, such as the server, the storage, and the network (for example, network switch), a power-supply installation and an air-conditioning installation become excessive. This increases a construction cost and an operational cost on the data center itself. Typically, the construction cost of the data center is known to be proportionate to the power consumption. Accordingly, there lies a need wishing to reduce the power consumption of the data center.

While the power consumption of the entire operation has an upper limit, there is known a device that changes the power consumption in accordance with a load. When all the devices (for example, processor in server and drive in storage) within all the units are in a fully operating state, that is, in a highly loaded state, it is possible that the power consumption of the entire operation exceeds its upper limit. Therefore, it is necessary to provide as much performance as possible while obeying the upper limit of the power consumption of the entire operation.

As a technique to reduce the power consumption, there is the following prior art.

Patent Literature 1 discloses that a service quality of a server system is maintained by interchanging electric power among the servers when there is a shortage in predicted power consumption. Specifically, according to Patent Literature 1, a power consumption managing unit that manages a power consumption of a server system to which a plurality of servers are coupled supplies a first server with an excessive power generated by degrading an operational level of a second server as another server in the server system when it is predicted that a power consumption of the whole server system becomes larger than a predetermined threshold value when the first server is activated.

CITATION LIST

Patent Literature

Patent Literature 1: Japanese Unexamined Patent Application Publication No. 2011-13764

SUMMARY OF INVENTION

Technical Problem

A hyper-converged system includes a plurality of general-purpose computers and one or more network units to which the plurality of general-purpose computers are coupled. In the hyper-converged system, each of the general-purpose computers (hereinafter also referred to as "nodes") holds data, and there is an upper limit in power consumption for each of the nodes. When the node is fully operated, the power consumption of this node exceeds its upper limit. A method that moves at least one VM from this node to another node to reduce the power consumption of this node is possible. However, in the hyper-converged system, this method has at least one problem of the followings.

In each of the general-purpose computer, data used by an application executed in this general-purpose computer is stored in a local storage device (storage device in this general-purpose computer). In view of this, when the VM that executes this application moves between the nodes, an access between nodes is necessary for accessing the data. In view of this, the performance degrades.

While it is possible that the data also moves between the nodes together with the move of the VM, in this case, a storage device in the destination node does not necessarily have an empty region enough to store all the data to be moved.

Solution to Problem

A plurality of computers include a plurality of components including a plurality of types of components. In each of the plurality of computers, the plurality of components include at least one processor and at least one storage device. Each of the plurality of components provides a performance and consumes an electric power within a range of an upper limit performance and an upper limit power consumption of a power state set for the component among a plurality of power states corresponding to a type of the component. A processor unit (one or more processors provided inside or outside the plurality of computers) determines whether a budget power as a power consumption permitted for a target computer (computer as power adjustment target) is equal to or more than a power consumption of the target computer or not. When the determination result is false, for at least one component of the target computer, the processor unit selects a power state based on at least one of a priority of an operation using the component and a data characteristic corresponding to the component among a plurality of types of power states corresponding to a type of the component as power state of the component.

Advantageous Effects of Invention

With the present invention, it is expected to provide both a power consumption reduction and a performance degradation reduction at the same time in a hyper-converged system.

BRIEF DESCRIPTION OF DRAWINGS

FIG. 8 illustrates a configuration of an operating state managing table.

FIG. 9 illustrates a configuration of a component characteristic table.

FIG. 10 illustrates a configuration of a required electric energy table.

FIG. 11 illustrates a configuration of an operation priority managing table.

FIG. 12 illustrates a configuration of a utilization rate managing table.

FIG. 13 illustrates a configuration of a data characteristic managing table.

DESCRIPTION OF EMBODIMENTS

Figure 1:
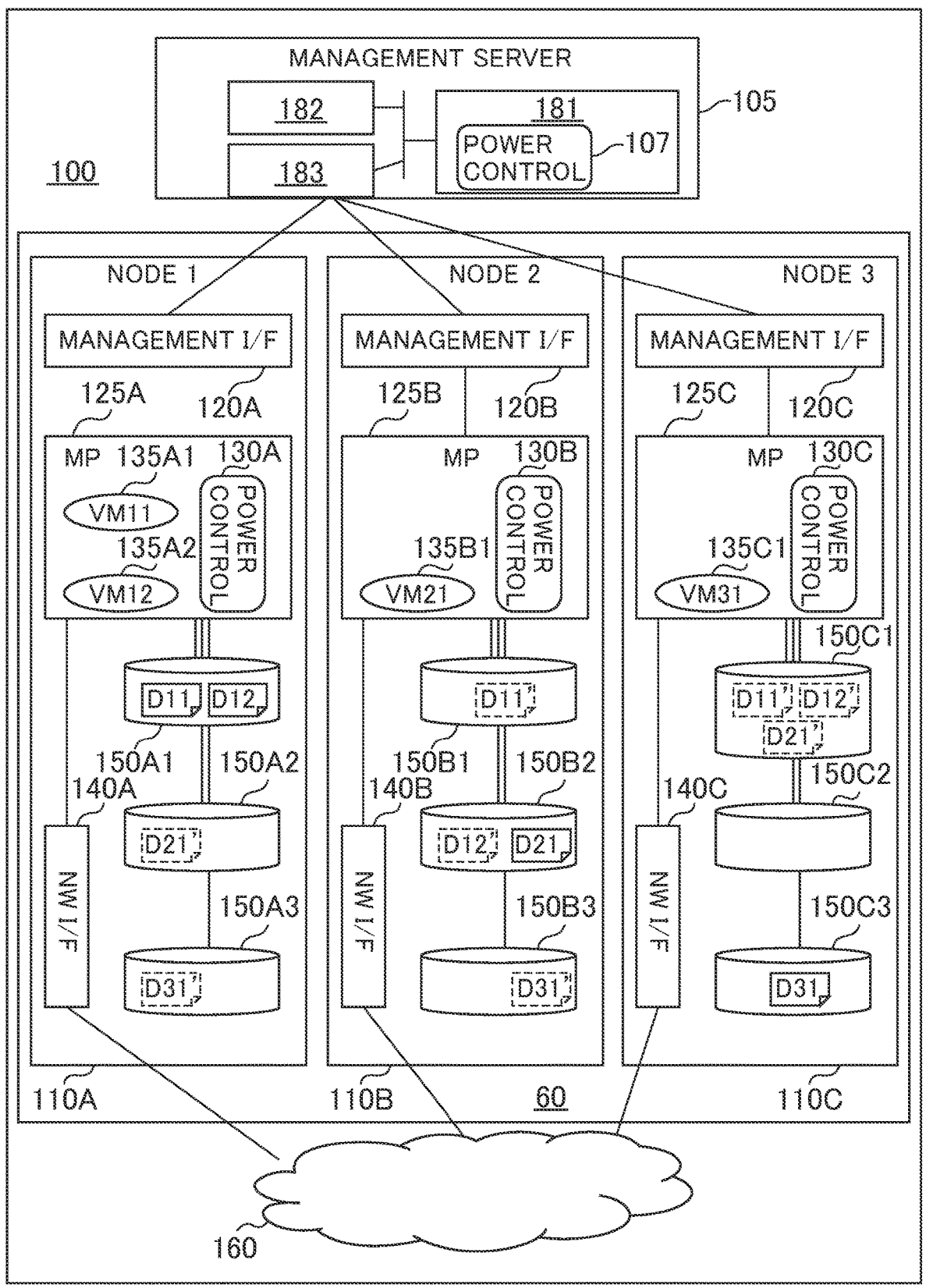
FIG. 1 illustrates a configuration of a hyper-converged system according to one embodiment of the present invention.

While the following description describes information by an expression such as "abc table" in some cases, the information may be expressed by any data structure besides the table. It is also allowed to refer to "abc table" as "abc information" in order to indicate that it does not depend on the data structure. In the following description, configurations of respective tables are one example. One table may be divided into two or more tables, or all or a part of two or more tables may be in one table.

In the following description, "interface unit" includes one or more interface devices. The one or more interface devices may be one or more similar interface devices (for example, one or more Network Interface Cards (NIC)) or may be two or more different interface devices (for example, NIC and Host Bus Adapter (HBA)).

In the following description, "memory unit" includes one or more memories. At least one memory regarding the memory unit may be a volatile memory. The memory unit is mainly used when a processor unit performs processing.

In the following description, "processor unit" includes one or more processors. At least one processor typically is a microprocessor like a Central Processing Unit (CPU). Each of one or more processors may be single processor core or may be multiple processor core. The processor may include a hardware circuit that performs a part or all of the process.

In the following description, there is a case where the process is described using "program" as a subject. This program is to be executed by the processor unit (for example, CPU) and is to execute a determined process. Since it is appropriately performed using the memory unit and the communication interface device (for example, communication port), the subject of the process may be the processor unit. The program may be installed into each computer from a program source code. The program source code may be one that is provided by, for example, a program distribution server or a storage medium. In the following description, two or more programs may be implemented in one program, or one program may be implemented as two or more programs.

While in the following description, each element is identifiable with, for example, a number, other types of identification information, such as a name, may be used as long as the information is identifiable. While in the drawings and description of the embodiment, identical parts are attached by identical reference numerals, the present invention is not limited to the following embodiment, and the technical scope of the present invention encompasses any application examples that coincide with the thoughts of the present invention. Unless otherwise limited, it is no problem whether each component is plural or single.

In the following description, in some cases, when similar elements are described without distinction, a reference numeral (or shared reference numeral in it) is used, and when the similar elements are distinguished, a reference numeral (or identification number of element) is used. For example, when a node is not distinguished, it may be referred to as "node 110," and when the node is distinguished, it may be referred to as, for example, "node 110A," "node 110B," and "node 110C." For example, when a VM is not distinguished, it may be referred to as "VM 135," and when the VM is distinguished, it may be referred to as, for example, "VM 11" and "VM 12."

In the following description, "management system" may be configured of one or more computers. Specifically, for example, when a management computer includes a display device and the management computer displays information on its display device, the management computer may be a management system. For example, when the management computer (for example, server) transmits display information to a remote computer system for displaying (for example, client) and the remote computer system displays this information (when management computer displays information on remote computer system), a system that includes at least the management computer of the management computer and the remote computer system may be the management system. The management system may include the interface unit, the memory unit, and the processor unit coupled to them. The interface unit may include at least one of the user interface unit and the communication interface unit. The user interface unit may include at least one I/O device of one or more I/O devices (for example, input device (for example, keyboard and pointing device) and output device (for example, display device)) and the remote computer system. The communication interface unit may include one or more communication interface devices. The computer in the management system "displaying display information" may be displaying the display information on the display device that the computer includes or may be the computer transmitting display information to display computer (in case of the latter, display information is displayed by display computer).

In the following description, "computer system" includes a plurality of physical computers (typically, general-purpose computer). At least one physical computer may execute a virtual computer (for example, Virtual Machine (VM)) or may execute Software-Defined anything (SDx). For SDx, for example, a Software Defined Storage (SDS) or a Software-defined Datacenter (SDDC) can be employed. An exemplary computer system is a hyper-converged system according to the following embodiment. In the hyper-converged system, for example, the respective computers (respective nodes) may have hypervisors. The hypervisor may generate a server VM that operates as a server and a storage VM that operates as a storage. In each of the computers, the server VM issues an I/O request, and the storage VM performs I/O with respect to a local Solid State Drive (SSD) (SSD in this computer) in response to the I/O request from the server VM. When the I/O request is a write request, the storage VM can forward (write) data to be written in accordance with the write request to a remote SSD (SSD in computer different from computer that executes this storage VM) in addition to the local SSD. When the I/O request is a read request, the storage VM can read out data to be read in accordance with the read request from the local SSD. When the data to be read cannot be read out from the local SSD (for example, when failure has occurred in local SSD), the storage VM can read out this data to be read from the remote SSD that stores the data to be read.

In one embodiment of the present invention, a power consumption can be reduced while a performance in the hyper-converged system is maintained. The following describes the embodiment using the drawings. In the following description, for example, in each node (computer), the storage device may be the Solid State Drive (SSD), in particular, the SSD that has a Non-Volatile Memory (NVM) Express (NVMe) as a connection interface.

FIG. 1 illustrates a configuration of a hyper-converged system according to the embodiment. In FIG. 1, reference numerals for components of a node 110a include shared reference numerals of these components and alphabets (A, B or C) included in α.

A hyper-converged system 100 includes a node system 60 that includes a plurality of nodes 110 (for example, three nodes 110A, 110B, and 110C), a network 160 for coupling the plurality of nodes 110, and a management server 105 that manages the plurality of nodes 110.

The management server 105 is an exemplary management system. The management server 105 includes an I/F 183, a memory 182, and a CPU 181 coupled to them.

The I/F 183 is an exemplary interface unit, and is coupled to management I/Fs 120 of the plurality of nodes 110. The management server 105 can communicate with each of the plurality of nodes 110 via the I/F 183.

The memory 182 stores information (for example, one or more tables) referred to or updated by the CPU 181 and one or more programs executed by the CPU 181. The one or more programs include, for example, at least a system power control module 107.

The CPU 181 executes the programs (at least, for example, system power control module 107) stored in the memory 182. At this time, the CPU 181 can appropriately refer to or update the information (table) in the memory 182.

The system power control module 107 may be executed in any of the nodes 110 instead of the management server 105. In this case, the management server 105 does not have to exist.

The node 110 includes the management I/F 120, a memory 126, a microprocessor (MP) 125, a network (NW) I/F 140, and a drive 150. At least one or plurality of MPs 125 and drives 150 each exist in each of the nodes 110.

The management I/F 120 is a communication interface device for communicating with the management server 105. As an interface for communicating with the management server 105, there is, for example, Ethernet (registered trademark). An interface for communicating with the management server 105 is only necessary to be an interface that can exchange some sort of information with the management server, and it may be, for example, Fibre Channel (FC), and nowadays, Fibre Channel over Ethernet (FCoE) that transmits a fibre channel packet over Ethernet (registered trademark).

The management I/F 120, the NW I/F 140, and the drive 150 are coupled to the MP 125. The MP 125 is a component that serves as a subject to execute data processing and arithmetic processing. On the MP 125, the VM 135 can operate. Specifically, for example, the MP 125 executes the hypervisor, and the hypervisor controls generation, execution, and termination of the VM 135. The VM 135 executes a program, such as an application program. The MP 125 executes a node power control module 130. The node power control module 130 is a program that optimizes a power consumption in the hyper-converged system 100 while communicating with the system power control module 107 that operates on the management server 105. For example, the node power control module 130 and data necessary for the node power control module 130 are stored in the memory 126 of the MP 125. It is possible that the module 130 is loaded to the MP 125 and the module 130 refers to the data from the memory 126 and stores the data in the memory 126 as necessary. The memory 126 holds management information that includes a configuration table including, for example, a list of components included in the node 110. The management information may include, for example, at least one of the tables illustrated in FIG. 8 to FIG. 13.

The NW I/F 140 is an interface for data communication between the nodes 110. An interface for data communication between the nodes 110 is only necessary to be an interface or a protocol, such as Ethernet (registered trademark), Fibre Channel (FC), and nowadays, Fibre Channel over Ethernet (FCoE) that transmits the fibre channel packet over Ethernet (registered trademark), NVM Express, and Infiniband, that can communicate any information.

For example, the data which the application on VM135 manages is stored in the drive 150. The drive 150 is a storage device (typically, non-volatile storage device). The drive 150 is an SSD (for example, NVMe-SSD) in this embodiment. The drive 150 may be a storage device (for example, non-volatile memory device) other than the SSD. It is also possible to use various kinds of media, such as an optical disk, a magnet-optical disk, a Magnetoresistive Random Access Memory (MRAM), a Phase Change Memory (PCM), a Resistive Random-Access Memory (ReRAM), and a Ferroelectric Random Access Memory (FeRAM) as a storage medium in the storage device. What is called a cascade connection configuration may be applied by using a plurality of switches. In the cascade connection configuration, a plurality of drive enclosures that include a plurality of drives are coupled.

The network 160 is a switch corresponding to the NW I/F 140. While communication is made among the management I/F 120, the NW I/F 140, the memory 126, and the MP 125 in accordance with PCI Express (registered trademark), it is only necessary that it is appropriate for communication between a plurality of boards or between components on the board, and, for example, Rapid IO (registered trademark) may be used. Between the MP 125 and the drive 150, for example, PCI-Express (registered trademark), NVM Express, or NVM Express over Fabric that extends NVM Express is used.

Now, in a storage system according to one comparative example, for example, Redundant Arrays of Inexpensive Disks (RAID) are configured in order to enhance availability of data.

Meanwhile, in the hyper-converged system 100, any method of, for example, the following (x) and (y) can be employed. (x) Identical data is stored in the two or more nodes 110 among the plurality of nodes 110, that is, the data is multiplexed by n (n is integer of two or more) between the nodes 110. (y) Data is divided, a correcting code is generated from the divided data, and the divided data and the correcting code are arranged dispersed between the nodes 110 (Erasure Coding).

In this embodiment, (x) is employed. Data is indicated by "D xx" in the drive 150 (each xx is number), and "xx" corresponds to "xx" in a notation "VM xx" of the VM 135. For example, D 11 corresponds to VM 11. "D xx" are illustrated with solid lines and dotted lines. The solid line indicates a state where the VM and the data exist in the identical node. The dotted line indicates that the VM and the data are in different nodes.

The VM 135 illustrated in FIG. 1 may be the server VM of the server VM and the storage VM. At least one storage VM exists in each of the nodes 110. The server VM can issue an I/O request to the storage VM in the node 110 including this server VM.

With reference to FIG. 8 to FIG. 13, various kinds of tables will be described. Each of the tables illustrated in FIG. 8 to FIG. 13 is stored in at least one of the memories 126 of the respective nodes 110 and the memory 182 of the management server 105. FIG. 8 illustrates a configuration of an operating state managing table.

An operating state managing table 810 holds information regarding operating states of the MP 125 and the drive 150 in the node 110 corresponding to this table 810. Specifically, for example, the operating state managing table 810 has an entry for each component (the MP 125 or the drive 150) in the node 110 corresponding to this table 810. Each of the entries holds information, such as a component #820, a component name 830, a power state 840, a used time 850, and an operation #860.

The component #820 indicates an identification number of the component (for example, component "2" is SSD 1).

The component name 830 indicates a name of the component. The name of the component is, for example, a combination (for example, "MP 1," "SSD 1," and "SSD 2") of a type name of the component ("MP" or "SSD") and a number assigned to the components of a kind.

The power state 840 indicates a power state of the component (for example, the component 2 is in "Normal" (that is, in a power state where maximum performance can be provided)).

The used time 850 indicates a used time (elapsed time) since the component has come into the power state. The operation #860 indicates an identification number of an operation that uses the component (for example, the component 2 is used in operation 1 and operation 2). "Operation" corresponds to an application. The operation is executed on the VM.

FIG. 9 illustrates a configuration of a component characteristic table.

A component characteristic table 910 may have a content that is a content shared between the plurality of nodes 110. The component characteristic table 910 holds information regarding characteristics of the various kinds of components. The component characteristic table 910 has an entry for each component type. Each of the entries holds information, such as a type 920, a power state 930, a performance 940, and power consumption 950.

The type 920 indicates the type name of the component ("MP" or "SSD").

The power state 930 indicates a power state supported by the component corresponding to the type. In this embodiment, as values of the power state 930, there are "Normal," "LP 1," and "LP 2." "Normal" is a power state where a maximum performance of the component can be provided. "LP 1" is in a power state with a reduced power consumption with respect to "Normal." "LP 2" is in a power state with a reduced power consumption with respect to "LP 1."

The performance 940 indicates a relative performance ratio of the power state when it is compared with that of "Normal." For example, for the type 920 "MP," the performance 940 corresponding to "LP 1" is "80%." This means that "LP 1" relatively has a processing performance of 80% compared with that of "Normal" for the type 920 "MP."

The power consumption 950 indicates a power consumption of the component.

According to FIG. 9, a plurality of types of power states exist for each component type. Various kinds of power states are defined by combinations of upper limit performances and upper limit power consumptions. That is, each component provides a performance and consumes an electric power within a range of the upper limit performance and the upper limit power consumption in accordance with the power state set for this component among a plurality of power states corresponding to the type of this component. The power state differs by a height of the upper limit performance. The higher the upper limit performance is, the higher the upper limit power consumption tends to be.

FIG. 10 illustrates a configuration of a required electric energy table 1010.

The required electric energy table 1010 holds information regarding a required electric power of the MP 125 and the drive 150 in the node 110 corresponding to this table 1010. Specifically, for example, the required electric energy table 1010 has an entry for each component (the MP 125 or the drive 150) in the node 110 corresponding to this table 1010. Each of the entries holds information, such as a component #1020, a component name 1030, a required performance 1040, a required power state 1050, a power consumption 1060, and an operation #1070.

The component #1020 indicates an identification number of the component.

The component name 1030 indicates a name of the component (including type name).

The required performance 1040 indicates a required performance of the component. "Required performance" is, for example, a performance (for example, unit is in %) required within the maximum performance (for example, "100%") that can be provided by the component.

The required power state 1050 indicates a power state required for the component.

The power consumption 1060 indicates a power consumption corresponding to the required power state of the component.

The operation #1070 indicates an identification number of an operation that uses the component.

FIG. 11 illustrates a configuration of an operation priority managing table.

An operation priority managing table 1110 holds information regarding a priority of operations executed in the node 110 corresponding to this table 1110. Specifically, for example, the operation priority managing table 1110 has an entry for each operation executed in the VM on the node 110 corresponding to this table 1110. Each of the entries holds information, such as an operation #1120, a priority 1130, and a component list 1140.

The operation #1120 indicates an identification number of the operation.

The priority 1130 indicates a priority of the operation. In this embodiment, values of the priority 1130 are two kinds of "high" and "low," but there may be three kinds or more.

The component list 1140 is a list of the component names of the components used by the operation.

FIG. 12 illustrates a configuration of a utilization rate managing table.

A utilization rate managing table 1200 holds information regarding a utilization rate of the component (the MP 125 or the drive 150) in the node 110 corresponding to this table 1200. Specifically, for example, the utilization rate managing table 1200 has an entry for each component corresponding to this table 1200. Each of the entries holds information, such as a component number 1210, a component name 1220, a utilization rate 1230, a utilization rate threshold 1240, an exceeded count 1250, a count threshold 1260, an elapsed time 1270, a time threshold 1280, and an adjustment object part 1290.

The component #1210 indicates an identification number (serial number) of the component.

The component name 1220 indicates a name (including type name) of the component.

The utilization rate 1230 indicates a collected utilization rate (performance).

The utilization rate threshold 1240 indicates a threshold value as an upper limit of the utilization rate 1230. For example, with respect to the utilization rate threshold 1240 "90%" corresponding to the component #1210 "1," the utilization rate 1230 corresponding to this component #1210 "1" is "60%," and thus, this case has no problem.

The exceeded count 1250 indicates a count that the utilization rate 1230 has exceeded the utilization rate threshold 1240. For example, the exceeded count 1250 for the component #1210 "1" is "1," and thus, it is seen that the utilization rate 1230 has exceeded the utilization rate threshold 1240 "90%" once.

The count threshold 1260 indicates a threshold value as an upper limit of the exceeded count 1250. For example, the exceeded count 1250 for the component #1210 "1" is "5," and thus, it is seen that the utilization rate 1230 is permitted to exceed the utilization rate threshold 1240 by four times. When the exceeded count 1250 reaches the count threshold 1260, the node 110 (the node power control module 130) determines that the component corresponding to the component #1210 "1" requires better processing performance, and can transmit a power readjustment request to the management server 105.

The elapsed time 1270 indicates an elapsed time since the utilization rate 1230 has exceeded the utilization rate threshold 1240. For example, the component (MP 1) corresponding to the component #1210 "1" has the utilization rate 1230 having exceeded the utilization rate threshold 1240 for 0.3 seconds.

The time threshold 1280 indicates a threshold value as an upper limit of the elapsed time 1270. For example, the time threshold 1280 for the component #1210 "1" is "1" (one second). When the elapsed time 1270 reaches this time threshold 1280, the node 110 (the node power control module 130) determines that the component corresponding to the component #1210 "1" requires better processing performance, and can transmit a power readjustment request to the management server 105.

The adjustment object part 1290 indicates whether a power state of the component is an adjustment target or not. For example, a component (SSD 1) corresponding to the component #1210 "2" has the exceeded count 1250 of "5" as well with respect to the count threshold 1260 "5." In view of this, the adjustment object part 1290 corresponding to the component #1210 "2" is "Yes."

FIG. 13 illustrates a configuration of a data characteristic managing table.

A data characteristic managing table 1300 holds information regarding data characteristics stored in the drive 150 in the node 110 corresponding to this table 1300. The data characteristic managing table 1300 has an entry for each drive 150 in the node 110 including this table 1300. Each of the entries holds information, such as a component #1310, a LUN 1320, a start address 1330, an end address 1340, a VM name 1350, and a characteristic name 1360.

The component #1310 indicates an identification number of the component (here, drive). The component #1310 "2" to "4" correspond to the component #1210 "2" to "4" in FIG. 12, respectively.

The LUN 1320 indicates a Logical Unit Number (LUN) as an identification number of a logic volume based on the drive. For example, based on the drive (SSD 1) corresponding to the component #1310 "2," it is seen that two respective logic volumes corresponding to the LUN 1320 "1" and "2" are provided.

The start address 1330 and the end address 1340 indicate an address range of the logic volume. The address mentioned here may be, for example, a logical address viewed from an application (operation on VM).

The VM name 1350 indicates a name of the VM that executes the operation that uses the logic volume based on the drive 150.

The characteristic name 1360 indicates a name of a characteristic of data stored in the logic volume based on the drive 150. As values of the characteristic name 1360, there are "Original" and "Copy." "Original" means data that exists in a node (local drive) in which its user application (operation) exists. Meanwhile, "Copy" means data that exists in a node (remote drive) different from the node in which its user application exists.

While in this embodiment, a data characteristic is associated with each logic volume, the data characteristic may be associated with a larger unit or a smaller unit than the logic volume. For example, the data characteristic may be associated with each unit region or data in the logic volume.

The following describes a process performed in this embodiment.

Figure 2:
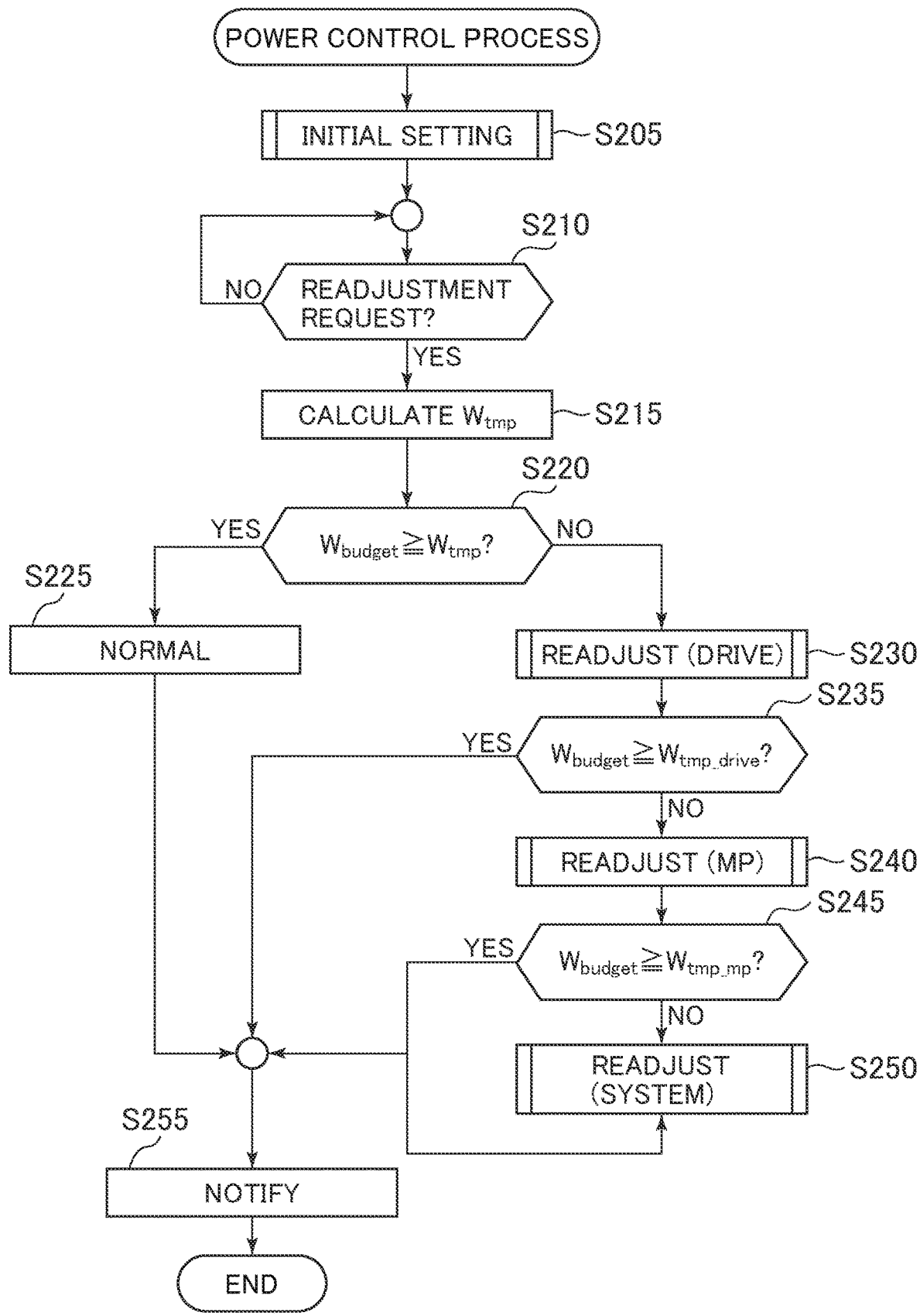
FIG. 2 is a flowchart of a power control process.

FIG. 2 is a flowchart of a power control process.

At S205, the system power control module 107 executes an initial setting process (FIG. 3) including initial settings of a budget power $W_{budget}$ for each of the nodes 110 and a power state for a component, such as the MP 125, in each of the nodes 110.

Next, at S210, the system power control module 107 determines whether there is a power readjustment request from at least one of the nodes 110 or not. When the determination result at S210 is true, the process proceeds to S215. When the determination result at S210 is false, the system power control module 107 may stand by until receiving the request, may terminate this power control process when the determination result at S210 does not become true even though the determination at S210 is continuously executed for X times (X is natural number), or may execute a process other than this power control process.

At S215, the system power control module 107 responds to the power readjustment request to calculate an electric power $W_{tmp}$ of when a power state of an adjustment target component (component that requires readjustment of electric power (component corresponding to adjustment object part 1290 "Yes")) is provisionally set to "Normal" (power state where maximum performance of this component is provided) for the power readjustment target node (node that has transmitted power readjustment request) 110. That is, the system power control module 107 calculates an electric power $W_{tmp}$ of the power readjustment target node 110 required for the application that operates on the VM 135 not to degrade the performance. "Adjustment target component" is a component that corresponds to the adjustment object part 1290 "Yes."

At S220, the system power control module 107 determines whether the budget power $W_{budget}$ for the power readjustment target node 110 is equal to or less than the electric power $W_{tmp}$ calculated at S215 for this node 110 or not.

When the determination result at S220 is true, the system power control module 107 sets the power state of the adjustment target component to "Normal" at S225. This ensures providing the maximum performance for the application operating on the VM.

When the determination result at S220 is false, that is, when $W_{budget} < W_{tmp}$, the system power control module 107 executes the power readjustment process (FIG. 4) for all the drives 150 in the power readjustment target node 110 at S230. This is in the situation where $W_{tmp}$ exceeds $W_{budget}$, when the power condition of an adjustment object part is set to "Normal.". The electric power adjustment in the node 110 or the system 100 is attempted maintaining the maximum processing performance to application under such a situation as much as possible.

At S235, the system power control module 107 determines whether $W_{budget} \geq W_{tmp\_drive}$ or not for the power readjustment target node 110 after S230. $W_{tmp\_drive}$ is an electric power calculated for the power readjustment target node 110 at S230.

When the determination result at S235 is false, the system power control module 107 executes the power readjustment process (FIG. 5) of the MP 125 in the power readjustment target node 110 at S240.

At S245, the system power control module 107 determines whether $W_{budget} \geq W_{tmp\_mp}$ or not for the power readjustment target node 110 after S240. $W_{tmp\_mp}$ is an electric power calculated for the power readjustment target node 110 at S240.

When the determination result at S245 is false, the system power control module 107 executes the power readjustment process (FIG. 6) in the whole converged system at S250.

In this embodiment, types of the adjustment target components are, firstly, the drive, next, the MP, and lastly, the system. 100. This is because the above-described order has a high power adjustment effect. Specifically, for example, in this embodiment, the drive has a high percentage in the total power consumption behind the MP in the data center. Also in the aspect of the processing performance, when the performance of the whole drive in the node is compared with the performance of the MP, the performance of the whole drive tends to be higher. This is because, in this embodiment, a high-performance interface, for example, the SSD that directly supports PCI Express typified by NVM Express is employed as the drive 150. Generally, since there is a correlation relationship (for example, proportionate relationship) between the processing performance and the power consumption, controlling the excessive processing performance of the drive 150 with respect to the MP processing performance ensures reduced power consumption while an effect on the processing performance of the system 100 is kept minimal. With such reasons, in this embodiment, the electric power of the drive is adjusted before the MP and the whole system.

When the determination result at S220 or S235 is true, the determination result at S245 is true, or after S250, the system power control module 107 notifies the power readjustment target node 110 of the power state after the power readjustment at S255.

After S255, the process is terminated, but may return to S210.

Figure 3:
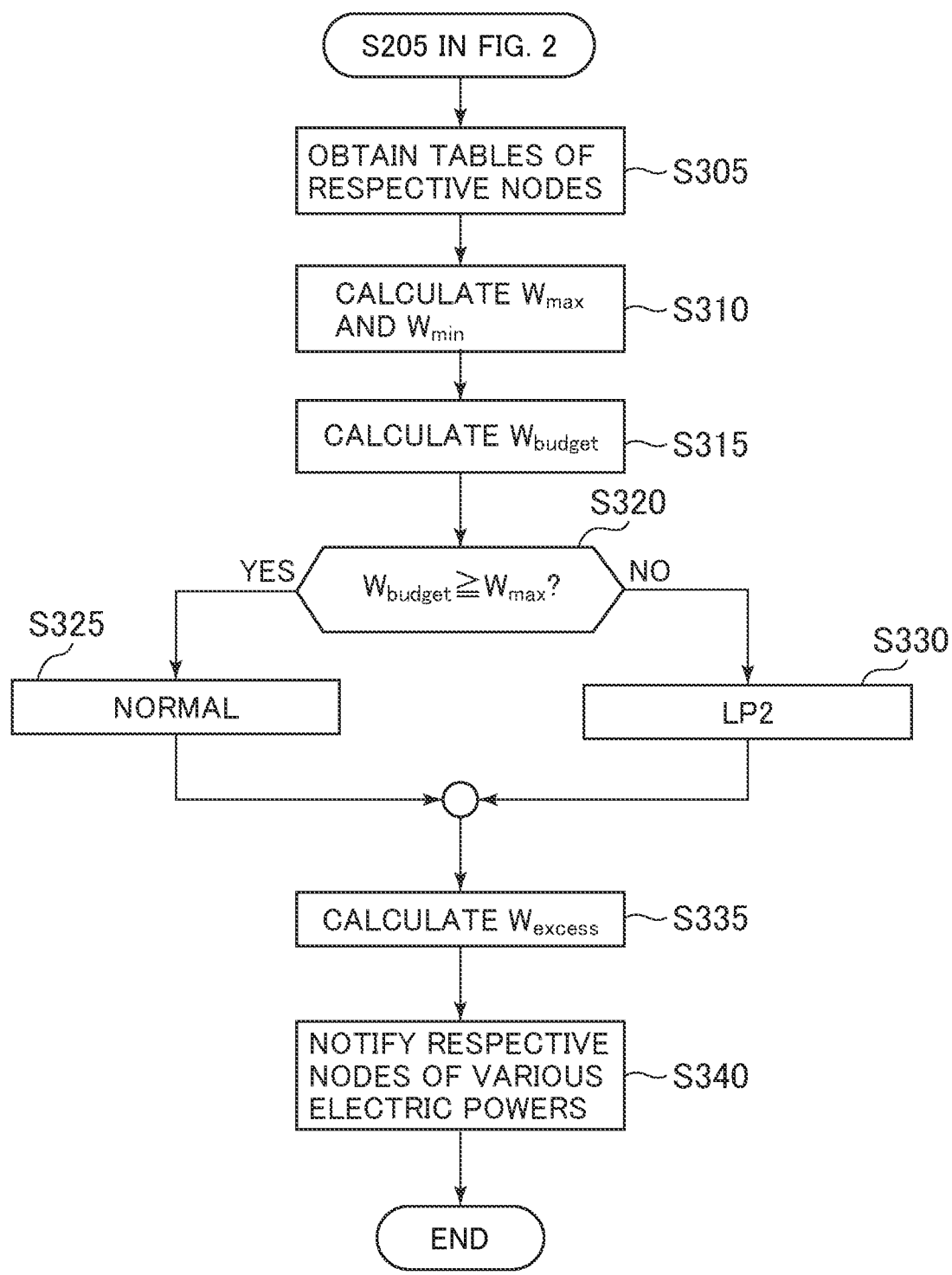
FIG. 3 is a flowchart illustrating details of S205 in FIG. 2.

FIG. 3 is a flowchart illustrating details of S205 in FIG. 2.

First, at S305, the system power control module 107 obtains information included in at least one table (for example, configuration table and the component characteristic table 910) stored in the memory 126 of the node 110 from each of the nodes 110. The system power control module 107, based on this information, identifies each of the power states 930, and performances 940 and power consumptions 950 for each power state 930 for each of the components (the MP 125 or the drive 150) of each of the nodes 110. As described above, the table included in each of the nodes 110 may be stored in the memory 182 of the management server 105.

Next, at S310, the system power control module 107 calculates a power consumption $W_{max}$ at the maximum performance and a power consumption $W_{min}$ at the minimum performance for each of the nodes 110 based on the various kinds of information identified at S305. $W_{max}$ is a total of a plurality of the power consumptions 950 corresponding to the respective maximum performances 940 of all the components. $W_{min}$ is a total of a plurality of the power consumptions 950 corresponding to the respective minimum performances 940 of all the components.

At S315, the system power control module 107 calculates a budget power $W_{budget}$ for each of the nodes 110. The budget power for each of the nodes 110 is the maximum power consumption permitted for this node 110. For example, the budget power for each of the nodes 110 may be the power consumption obtained by equally distributing the power consumption permitted for the whole system 100 to the number of the nodes in the system 100.

At S320, the system power control module 107 determines whether $W_{budget} \geq W_{max}$ or not for each of the nodes 110.

For the node (hereinafter, referred to as excessive node) 110 whose determination result at S320 is true, the system power control module 107 determines the power state of each component of this excessive node 110 to be in "Normal" at S325. Meanwhile, for the node (hereinafter, referred to as depletion node) 110 whose determination result at S320 is false, the system power control module 107 determines the power state of each component of this depletion node to be the power state where the minimum performance is provided (in this embodiment, "LP 2") at S330.

At S335, the system power control module 107 calculates an excessive power $W_{excess}$ for each of the nodes 110. For the excessive node 110, $W_{excess} = W_{budget} - W_{max}$. For the depletion node 110, $W_{excess} = W_{budget} - W_{min}$.

Lastly, at S340, the system power control module 107 notifies the respective nodes 110 of various electric power values ($W_{max}$, $W_{min}$, $W_{budget}$ and $W_{excess}$).

Figure 4:
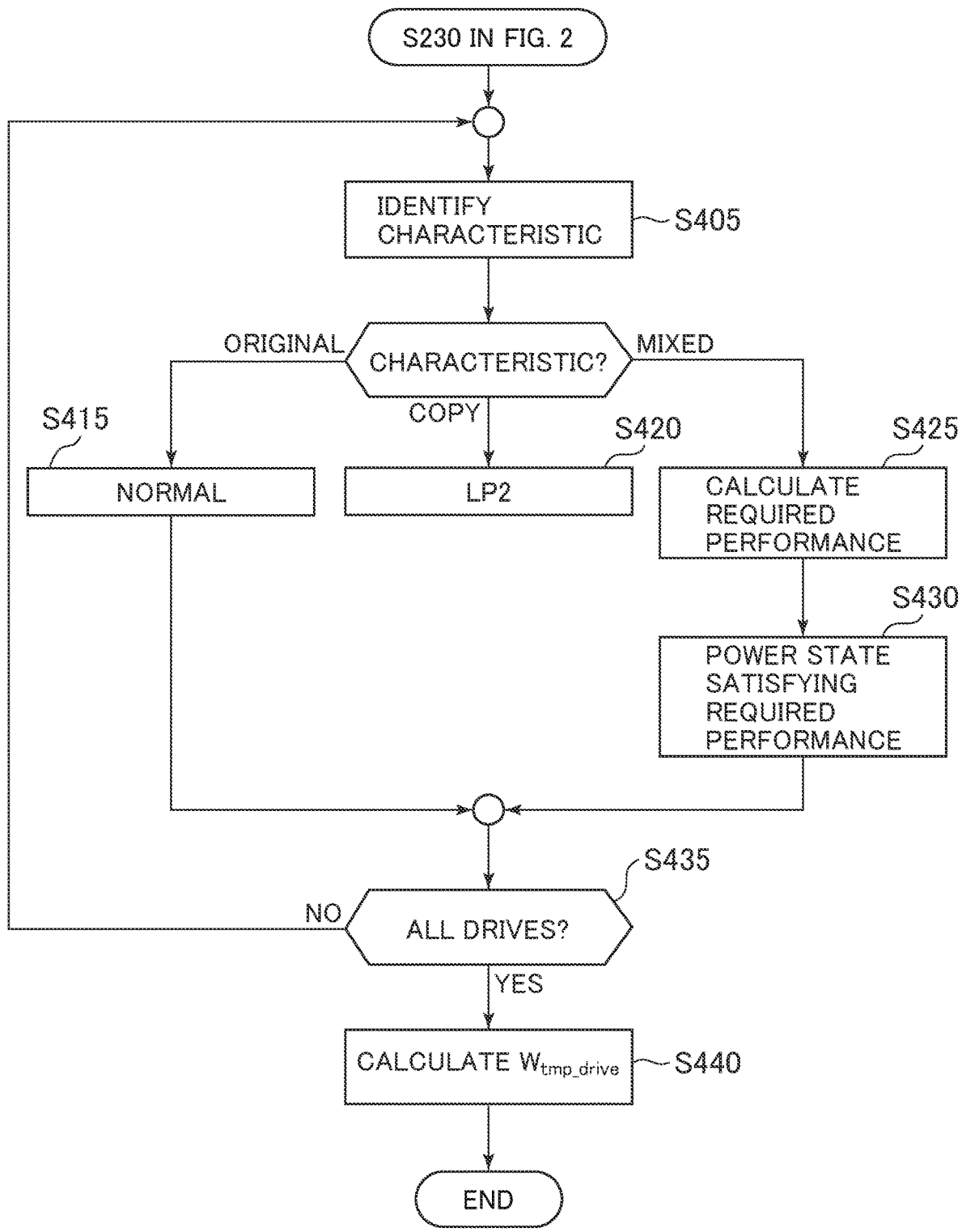
FIG. 4 is a flowchart illustrating details of S230 in FIG. 2.

FIG. 4 is a flowchart illustrating details of S230 in FIG. 2.

First, at S405, the system power control module 107 identifies data characteristic (characteristic name 1360) for each of the drives 150 of the power readjustment target node

110 based on information included in the data characteristic managing table 1300. The data characteristic managing table 1300 is held in, for example, the management server 105.

For the drive whose characteristic name identified at S405 is only "Original," the system power control module 107 determines the power state of this drive to be "Normal" at S415. The drive with the characteristic name of "Original" is a local drive (local SSD). The local drive (local SSD) is considered to have a high I/O frequency compared with the remote drive (remote SSD). Therefore, setting the power state of this drive to "Normal" is preferable in view of performance.

For the drive whose characteristic name identified at S405 is only "Copy," the system power control module 107 determines the power state of this drive to be the power state where the minimum performance is provided (for example, "LP 2") at S420. The drive with the characteristic name of "Copy" is a remote drive. The remote drive is considered to have a low I/O frequency compared with the local drive and considered that it does not require that high performance. Therefore, setting the power state of this drive to "LP 2" is preferable in view of power consumption.

When the characteristic name identified at S405 is a mixture of "Original" and "Copy," the system power control module 107 executes S425 and S430 for this drive. At S425, the system power control module 107 calculates a performance required for this drive from a utilization rate history (for example, the utilization rate 1230 for each time slot) of this drive 150. At S430, the system power control module 107 determines the power state of this drive to be a power state that matches the calculated performance. For a drive that is a local drive and a remote drive at the same time, it is preferable to thus take a balance of the performance and the power consumption.

At S435, the system power control module 107 determines whether the process from S405 to S430 has been executed for all the drives in the power readjustment target node 110 or not.

When the determination result at S435 is true, the system power control module 107 calculates a power consumption $W_{tmp\_drive}$ of the power readjustment target node 110 after the power state adjustment for all the drives 150 at S440. $W_{tmp\_drive}$ is a total of a plurality of the power consumption 950 corresponding to the respective power states of all the components after the power state adjustment for all the drives 150.

When the power readjustment target node 110 is a node in which the application actually processing user data operates, the data characteristic is "Original." Meanwhile, when the power readjustment target node 110 is any node other than the node in which the application actually processing user data operates, the data characteristic is "Copy." Metadata that serves as management information of which node stores the data is held by the management server 105 or each of the nodes 110. The data characteristic managing table 1300 can be generated from this metadata.

Figure 5:
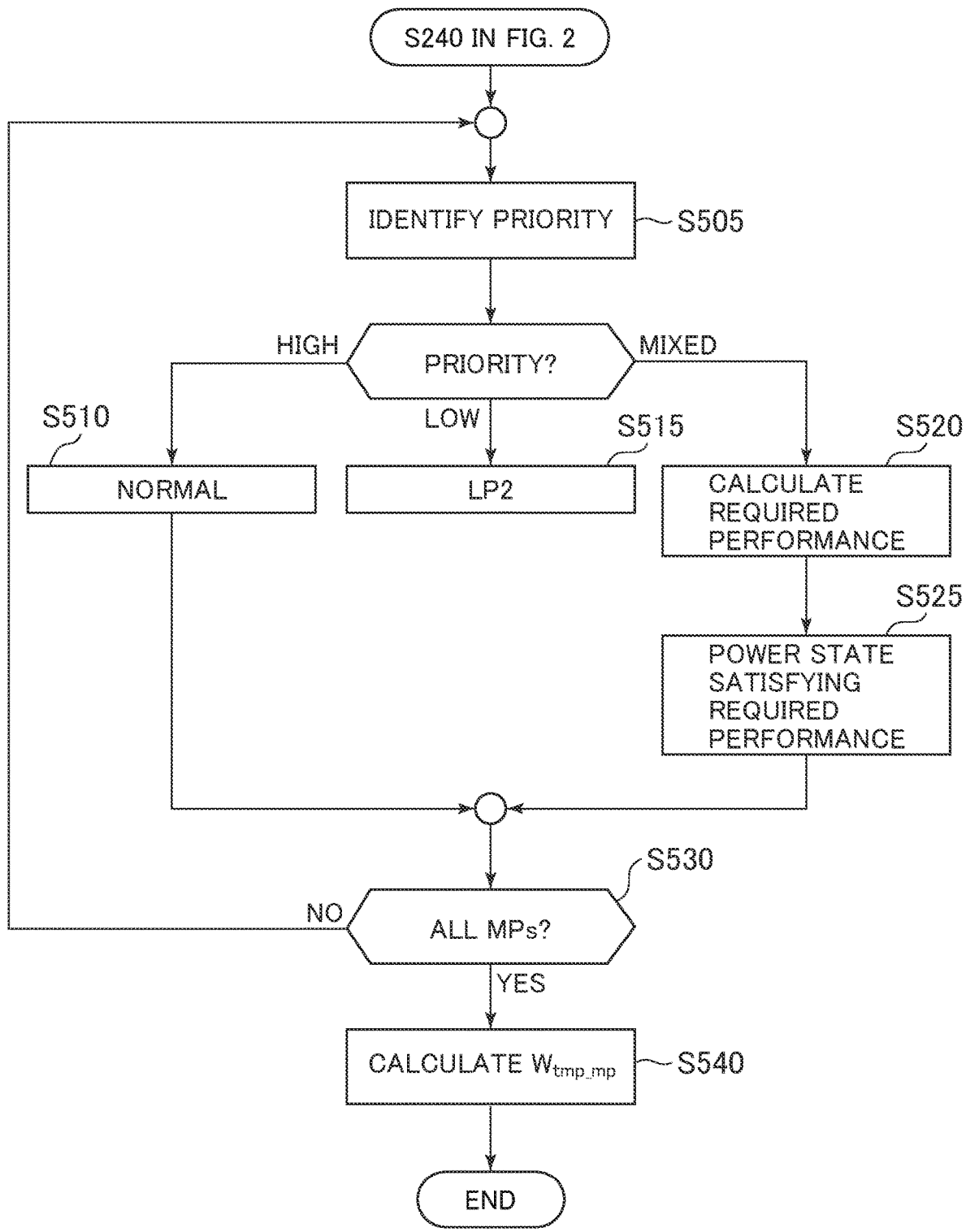
FIG. 5 is a flowchart illustrating details of S240 in FIG. 2.

FIG. 5 is a flowchart illustrating details of S240 in FIG. 2.

First, at S505, the system power control module 107 identifies a priority of operation for each of the MPs 125 of the power readjustment target node 110 based on the operation priority managing table 1110.

For the MP 125 whose priority identified at S505 is only "high," the system power control module 107 determines the power state of this MP 125 to be "Normal" at S510. The MP that executes the operation with "high" priority is considered that it requires a high performance. Therefore, it is preferable to set the power state of this MP to "Normal" in view of performance.

For the MP 125 whose priority identified at S505 is only "low," the system power control module 107 determines the power state of this MP 125 to be a power state in which the minimum performance is provided (for example, "LP 2") at S515. The MP that executes the operation with "low" priority is considered that it does not require a high performance. Therefore, it is preferable to set the power state of this MP to "LP 2" in view of power consumption.

When the priority identified at S505 is a mixture of "high" and "low," the system power control module 107 executes S520 and S525. At S520, the system power control module 107 calculates a required performance for this MP 125 from a utilization rate history (for example, the utilization rate 1230 for each time slot) of this MP 125. At S525, the system power control module 107 determines the power state of this MP 125 to be a power state that matches the calculated performance. For the MP that executes both the operation with "high" priority and the operation with "low" priority, it is preferable to thus take a balance of the performance and the power consumption.

At S530, the system power control module 107 determines whether the process from S510 to S525 is executed for all the MPs 125 in the power readjustment target node or not.

When the determination result at S530 is true, the system power control module 107 calculates a power consumption $W_{tmp\_mp}$ of the power readjustment target node 110 after the power state adjustment for all the MPs 125 in addition to all the drives 150 at S540. $W_{tmp\_mp}$ is a total of the plurality of power consumption 950 corresponding to the respective power states of all the components after the power state adjustment for all the MPs 125 in addition to all the drives 150.

Here, a description will be given of one example relating to the process at S425 in FIG. 4 and S520 in FIG. 5 when the power readjustment target is the MP 125.

For example, the utilization rate 1230 of a certain MP 125 is assumed to be 50% for ten seconds, 20% for three seconds, and 80% for five seconds during a measurement period of 18 seconds. A processing capability of this MP 125 is assumed to be 100 K IOPS. First, the system power control module 107 calculates a total IO processing count within this measurement period. Then, the total IO processing count within the measurement period in this MP 125 is 100 K IOPS×50%×10 seconds+100 K IOPS×20%×3 seconds+100 K IOPS×80%×5 seconds, and thus, it is 960 K IO. Since it is 18 seconds during this period, the required processing performance is 960 K IO/18 seconds, and thus, it can be calculated to be 53 K IOPS. Since this MP 125 has the processing performance of 100 K IOPS, it is only necessary that the utilization rate of this MP 125 has 53%. For example, according to the component characteristic table 910 in FIG. 9, the processing performance falls short with the power state 930 "LP 2" of the type 920 "MP." Thus, it is seen that the power state equivalent to "LP 1" is preferable. Thus, the power state is determined. For example, when a previous power state of this MP 125 is assumed to be "Normal", changing this power state to "LP 1" ensures reducing approximately 20 W of power consumption.

Figure 6:
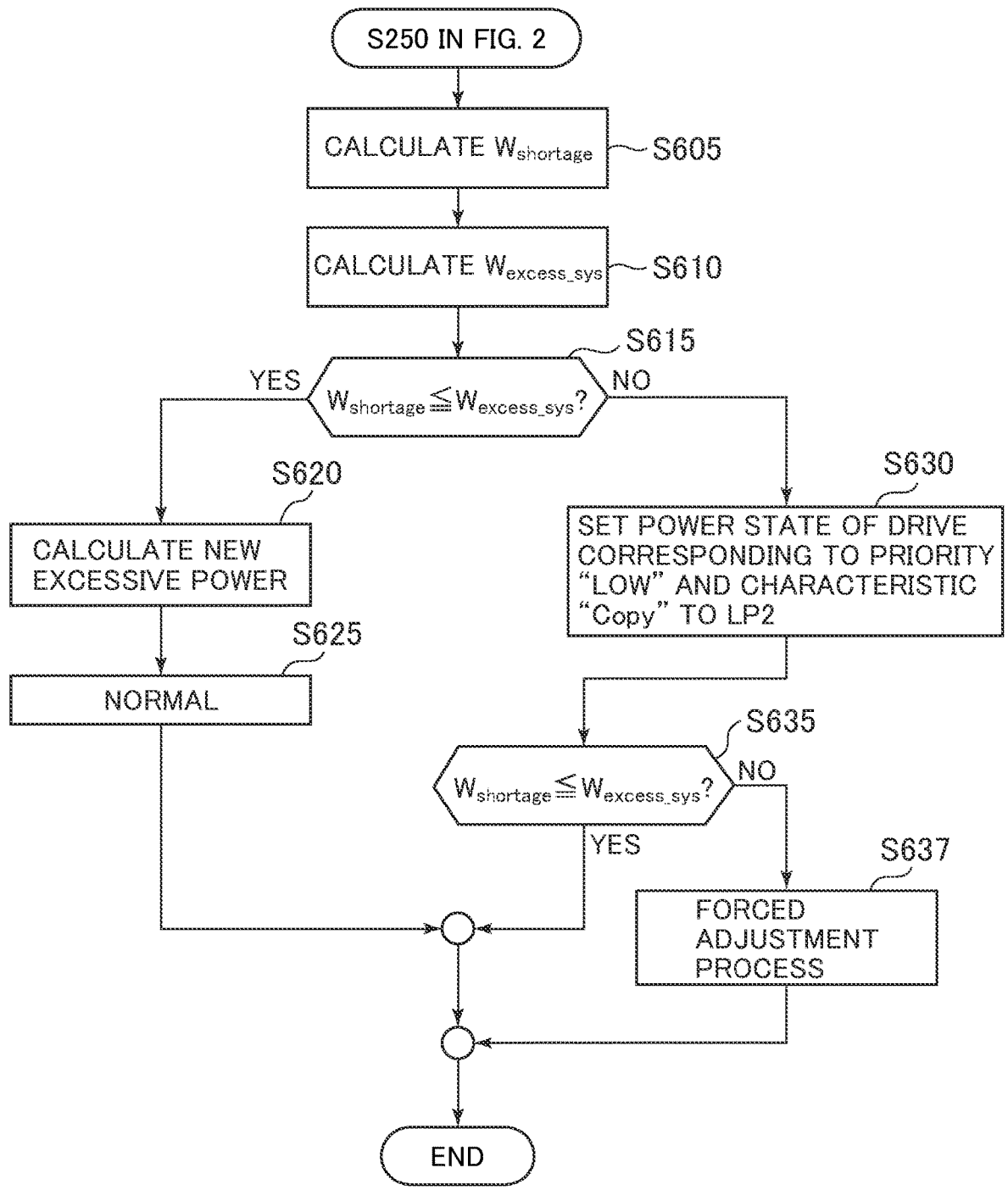
FIG. 6 is a flowchart illustrating details of S250 in FIG. 2.

FIG. 6 is a flowchart illustrating details of S250 in FIG. 2.

First, at S605, the system power control module 107 calculates a shortage in electric power $W_{shortage}$ in the power readjustment target node 110. $W_{shortage}$ is an absolute value of a difference between $W_{budget}$ and $W_{tmp\_mp}$ (power consumption of the power readjustment target node 110 after power state adjustment for all the MPs 125 in addition to all the drives 150).

Next, at S610, the system power control module 107 calculates an excessive power $W_{excess\_sys}$ in the system 100. $W_{excess\_sys}$ is a sum of excessive powers $W_{excess}$ of all the nodes 110.

At S615, the system power control module 107 determines whether $W_{shortage} \leq W_{excess\_sys}$ or not.

When the determination result at S615 is true, the system power control module 107 calculates a new excessive power=$W_{excess\_sys}-W_{shortage}$ of the system 100 at S620. At S625, the system power control module 107 determines the power state of the adjustment target component to be "Normal."

Meanwhile, when the determination result at S615 is false, the system power control module 107 determines the power state of the drive 150 corresponding to the operation priority "low" and the data characteristic "Copy" to be a power state (for example, "LP 2") where the minimum performance is provided at S630. This can set the power state for the drive determined not requiring the high performance from both aspects of the priority and the data characteristic to a preferable power state in view of power consumption. S630 possibly updates, for example, the power state determined at S430 in FIG. 4 or the power state determined at S525 in FIG. 5. The system power control module 107 calculates a power consumption (power consumption of the power readjustment target node 110) in the power state determined at S630. An absolute value of a difference between this power consumption and $W_{budget}$ of the power readjustment target node 110 is $W_{excess}$ after the update, and $W_{excess\_sys}$ is updated based on $W_{excess}$ after the update. At S635, the system power control module 107 determines whether $W_{shortage} \leq W_{excess\_sys}$ or not again. When the determination result at S635 is true, the process (S250 in FIG. 2) is terminated.

Meanwhile, when the determination result at S635 is false, the system power control module 107 executes a forced adjustment process within budget power for at least one node at S637. The forced adjustment process within budget power at S637 is, for example, forcibly degrading the power state for the component having a power state where the maximum performance is provided so as to fall within the budget power. That is, even though there temporarily is a performance degraded state, the power readjustment process takes a balance.

When the determination result at S615 is false, S630 and S635 may be skipped and S637 may be executed as long as there is no drive 150 that corresponds to the operation priority "low" and the data characteristic "Copy."

Figure 7:
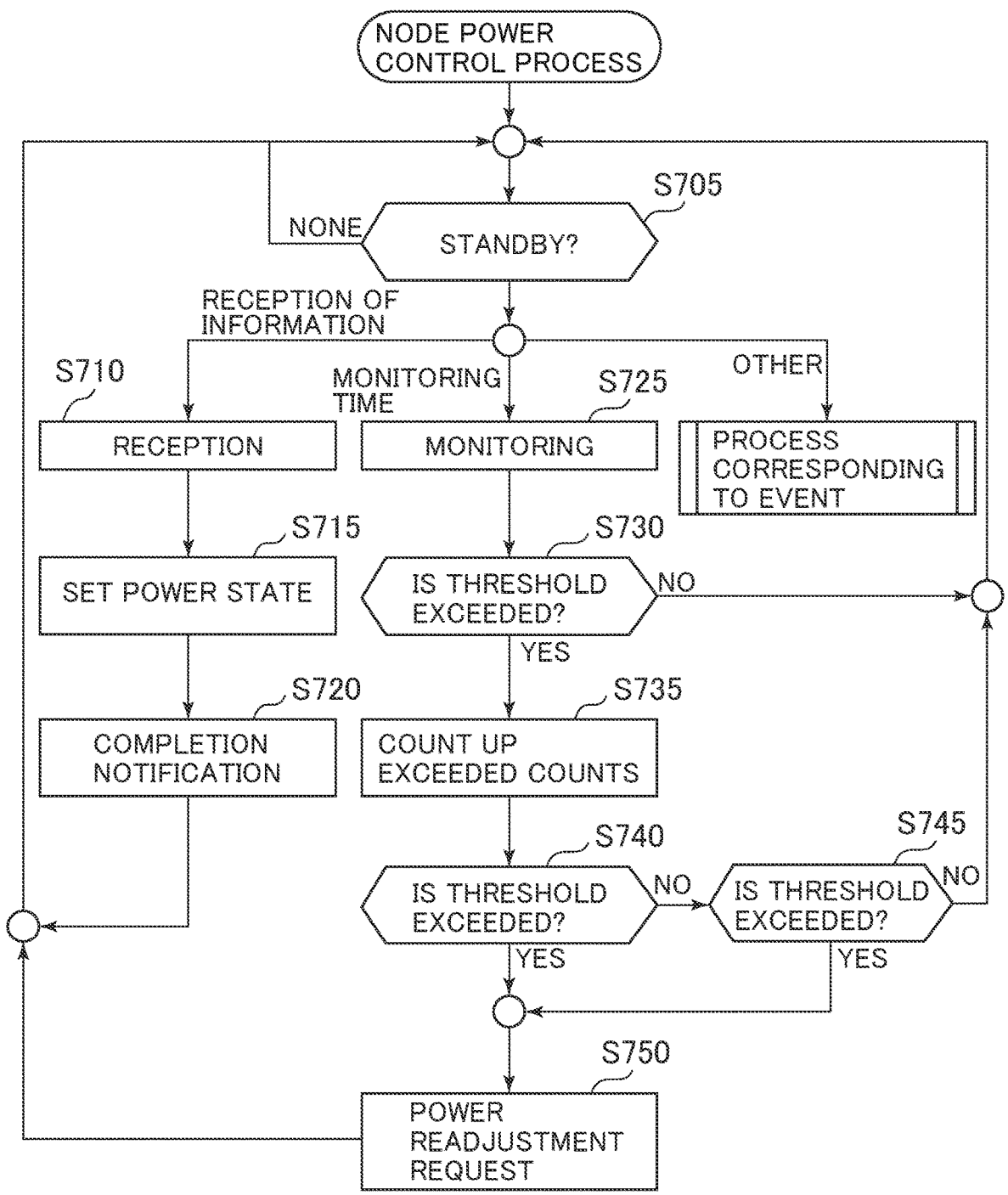
FIG. 7 is a flowchart of a node power control process.

FIG. 7 is a flowchart of a node power control process. The node power control process is a process executed in each of the nodes. Below as an example, it explains taking notice of one node.

In the node power control process, the node power control module 130 first determines whether any event has occurred or not at S705. The any event includes, for example, receiving information from the management server 105 and when the time to monitor the operating states of the components in the node 110 comes.

In S705, if some event is receiving information from the managing server 105, in S710, the node electric power control module 130 will receive the various electric power information from the managing server 105. Then, at S715, since the received information includes, for example, the power states notified at S255 in FIG. 2, the node power control module 130 starts to set the power states of the respective components in accordance with these power states. Lastly, at S720, the node power control module 130 transmits a setting completion notification to the management server 105, and stands by for an event again.

If some event is having become the time which monitors the system operating status of the parts in the node 110 in S705, the node electric power control module 130 updates the occupancy rate management table 1200 based on the occupancy rate which collected and collected the occupancy rates of each part article (for example, at least one elapsed time 1270 may be updated) in S725. Then, at S730, the node power control module 130 determines whether the utilization rate 1230 has exceeded the utilization rate threshold 1240 or not for each of the components. For the component whose determination result at S730 is true, the node power control module 130 increments the value of the exceeded count 1250 by one at S735. At S740, the node power control module 130 determines whether the component whose exceeded count 1250 is incremented has exceeded the count threshold 1260 of the exceeded count 1250 after the update or not. For the component whose determination result at S740 is true, the node power control module 130 transmits a power readjustment request specifying the component # of the component as the component # of the adjustment target component to the management server 105 at S750. An adjustment of the power state of the component having exceeded the count threshold 1260 of the exceeded count 1250 can be expected from this.

Meanwhile, when the determination result at S740 is false, the node power control module 130 determines whether the elapsed time 1270 has exceeded the time threshold 1280 or not for the component whose determination result at S730 is true at S745. For the component whose determination result at S745 is true, the node power control module 130 notifies the management server 105 of a power readjustment request specifying the component # of this component as the component # of the adjustment target component at S750. An adjustment of the power state of the component whose elapsed time 1270 has exceeded the time threshold 1280 can be expected from this.

With this embodiment, the power consumption in the system 100 can be reduced with as little reduced processing performance as possible. Also, the construction cost for a data center whose construction cost tends to be determined by the power consumption can be reduced.

Figure 14:
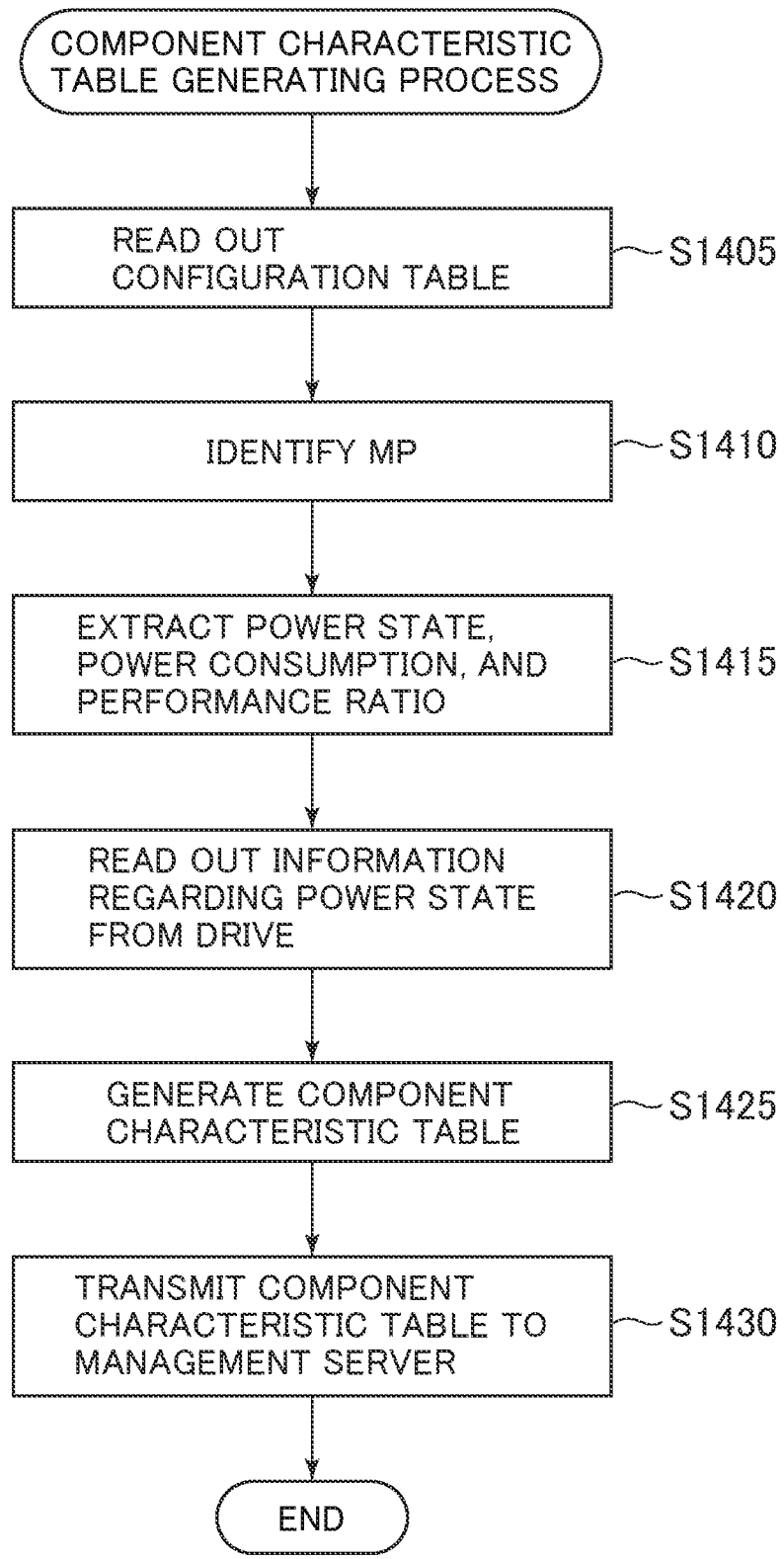
FIG. 14 illustrates a flowchart of a component characteristic table generating process.

FIG. 14 is a flowchart of a component characteristic table generating process. The component characteristic table generating process is a process executed in each of the nodes. The following employs one node as an example.

First, at S1405, the node power control module 130 reads out a configuration table of the node 110. At S1410, the node power control module 130 identifies the MP 125 that is included from the read configuration table. At S1415, the node power control module 130 extracts a power state, a power consumption, and a relative performance ratio of respective power states for the maximum performances from an MP power characteristic table (not illustrated) generated in advance. The respective power states for the maximum performances may be calculated simply assuming that the power consumption and the performance have a proportional relationship. At S1420, the node power control module 130 read out information regarding a power state supported by the drive 150 from each of the drives 150. For example, in NVM Express, since, for example, the power consumption and the performance information with respect to the power state are defined as a structure, this structure may be read out at S1420. At S1425, the node power control module 130 generates the component characteristic table 910 based on the information obtained at S1415 and S1420. At S1430 at last, the node power control module 130 transmits the generated component characteristic table 910 to the management server 105.

While the node power control module 130 is the main body to execute the component characteristic table generation process, it is no problem if the system power control module 107 of the management server 105 executes this process. In this case, S1430 can be omitted, and the component characteristic table 910 generated at S1425 is stored in the memory 182 (or drive (not illustrated)) of the management server 105.

The present invention is not limited to the above-described embodiment, and various modifications are included. For example, in the above-described embodiment, it is applied when a contention occurs in accessing a memory of a memory board, but it is not necessarily limited to this.

For example, the whole system may be the whole node system 60 instead of the whole hyper-converged system 100. Specifically, for example, the budget power for each of the node may be calculated based on the power consumption of the whole node system 60.

For example, the exemplary computer system may be the node system 60 instead of the hyper-converged system 100.

The system power control module 107 may display the process result as necessary. As the displayed process result, at least one of the following may be employed, for example: the result of the process at S205 in FIG. 2 (for example, various kinds of electric powers for each node 110), the result of the process at S230 in FIG. 2 (for example, power states of respective drives, and $W_{budget}$ and $W_{tmp\_drive}$ of node), the result of the process at S240 in FIG. 2 (for example, power states of respective MPs and respective drives, and $W_{budget}$ and $W_{tmp\_mp}$ node), and the result of the process at S250 in FIG. 2. This allows an administrator to know a condition of the power state and the like as necessary.

LIST OF REFERENCE SIGNS 100 hyper-converged system

The invention claimed is:

1. A computer system comprising:
a plurality of computers coupled to a network; and
a processor unit that is one or more processors disposed inside or outside the plurality of computers,
wherein the plurality of computers include a plurality of components including a plurality of types of components,
in each of the plurality of computers,
the plurality of components include at least one processor and at least one storage device,
each of the plurality of components provides a performance and consumes an electric power within a range of an upper limit performance and an upper limit power consumption of a power state set for the component among a plurality of power states corresponding to a type of the component,
the at least one processor executes a server VM and a storage VM, the server VM being a VM that issues an I/O request, the storage VM being a VM that performs I/O of data of an I/O target in response to the I/O request with respect to the at least one storage device, and
wherein the processor unit:
(A) determines whether a budget power as a power consumption permitted for a target computer is equal to or more than a power consumption of the target computer or not,
the target computer being a computer as a power adjustment target among the plurality of computers,
(B) when a determination result of (A) is false, for at least one storage device of the target computer, selects a power state as power state of the at least one storage device, the power state being based on at least one of a priority of an operation using the at least one storage device and a data characteristic corresponding to the at least one storage device among a plurality of types of power states corresponding to a type of the at least one storage device,
(C) determines whether the budget power is equal to or more than a power consumption after (B) for the target computer or not,
(D) when a determination result at (C) is false, for at least one processor of the target computer, selects a power state as power state of the at least one processor, the power state being based on a priority of an operation that uses the at least one processor among a plurality of types of power states corresponding to the at least one processor,
(E) determines whether the budget power is equal to or more than a power consumption after (D) or not for the target computer, and
(F) when a determination result at (E) is false, for at least one component of the target computer, selects a power state among a plurality of types of power states corresponding to a type of the at least one component as power state of the at least one component based on a shortage in electric power of the target computer and a whole excessive power of the plurality of the computers,
wherein the shortage in electric power of the target computer is a difference between a budget power of the target computer and a power consumption after (D) for the target computer,
wherein the whole excessive power is a total of a plurality of excessive powers corresponding to the plurality of respective computers, and
wherein for each of the plurality of computers, an excessive power is a difference between a budget power of the computer and a power consumption of the computer.

2. The computer system according to claim 1,
wherein the at least one component is a target component,
the target computer is a computer including the target component, and
the target component is a component whose performance has exceeded a threshold value by a predetermined count or more or performance has exceeded a threshold value for a certain period of time or more.

3. The computer system according to claim 1,
wherein the at least one storage device is at least one non-volatile memory device in each of the plurality of computers, and
wherein the processor unit
for at least one non-volatile memory device of the target computer, selects a power state as power state of the non-volatile memory device, the power state being based on a data characteristic corresponding to the non-volatile memory device among a plurality of types of power states corresponding to the non-volatile memory device at (B).

4. The computer system according to claim 3, wherein, at (B), an upper limit performance in accordance with the selected power state is higher when a data characteristic is an original than when a data characteristic is a copy.

5. The computer system according to claim 4, wherein, at (B), a power state selected for a non-volatile memory device whose data characteristic is both original and copy is a power state in accordance with a performance based on a performance history and a used time of the non-volatile memory device.

6. The computer system according to claim 3, wherein, at (C), an upper limit performance in accordance with the selected power state is high when a priority is relatively high.

7. The computer system according to claim 6, wherein, at (C), a power state selected for a processor corresponding to a plurality of different priorities is a power state in accordance with a performance based on a performance history and used time of the processor.

8. The computer system according to claim 1, wherein, at (F), when the shortage in electric power of the target computer is less than or equal to the whole excessive power,
the at least one component is a target component,
a power state selected for the target component is a power state having a highest upper limit performance among a plurality of power states corresponding to a type of the target component, and
the target component is a component whose performance has exceeded a threshold value by a predetermined counts or more or a component whose performance has exceeded for a certain period of time or more.

9. The computer system according to claim 1, wherein, at (F), when the shortage in electric power of the target computer is more than the whole excessive power,
the at least one component is a storage device whose priority is relatively low and data characteristic is copy, and
the selected power state is a power state having a lowest upper limit performance among a plurality of power states corresponding to a storage device.

10. The computer system according to claim 1, wherein the processor unit displays a selected power state.

11. The computer system according to claim 1, wherein the processor unit
(G) when a determination result at (A) is true, for at least one component of the target computer, selects a power state having a maximum upper limit performance among a plurality of types of power state corresponding to a type of the component as power state of the component.

12. A management system for a plurality of computers coupled to a network, the management system comprising:
an interface unit that is one or more communication interface devices coupled to the plurality of computers; and
a processor unit that is one or more processors coupled to the interface unit,
wherein the plurality of computers include a plurality of components including a plurality of types of components,
in each of the plurality of computers,
the plurality of components include at least one processor and at least one storage device,
each of the plurality of components provides a performance and consumes an electric power within a range of an upper limit performance and an upper limit power consumption of a power state set for the component among a plurality of power states corresponding to a type of the component,
the at least one processor executes a server VM and a storage VM, the server VM being a VM that issues an I/O request, the storage VM being a VM that performs I/O of data of an I/O target in response to the I/O request with respect to the at least one storage device, and
the processor unit
(A) determines whether a budget power as a power consumption permitted for a target computer is equal to or more than a power consumption of the target computer or not,
the target computer being a computer as a power adjustment target among the plurality of computers,
(B) when a determination result of (A) is false, for at least one storage device of the target computer, selects a power state as power state of the at least one storage device, the power state being based on at least one of a priority of an operation using the at least one storage device and a data characteristic corresponding to the at least one storage device among a plurality of types of power states corresponding to a type of the at least one storage device,
(C) determines whether the budget power is equal to or more than a power consumption after (B) for the target computer or not,
(D) when a determination result at (C) is false, for at least one processor of the target computer, selects a power state as power state of the at least one processor, the power state being based on a priority of an operation that uses the at least one processor among a plurality of types of power states corresponding to the at least one processor,
(E) determines whether the budget power is equal to or more than a power consumption after (D) or not for the target computer, and
(F) when a determination result at (E) is false, for at least one component of the target computer, selects a power state among a plurality of types of power states corresponding to a type of the at least one component as power state of the at least one component based on a shortage in electric power of the target computer and a whole excessive power of the plurality of the computers,
wherein the shortage in electric power of the target computer is a difference between a budget power of the target computer and a power consumption after (D) for the target computer,
wherein the whole excessive power is a total of a plurality of excessive powers corresponding to the plurality of respective computers, and
wherein for each of the plurality of computers, an excessive power is a difference between a budget power of the computer and a power consumption of the computer.

13. An electric power control method for a computer system including a plurality of computers coupled to a network,
   wherein the plurality of computers include a plurality of components including a plurality of types of components,
   in each of the plurality of computers,
      the plurality of components include at least one processor and at least one storage device,
      each of the plurality of components provides a performance and consumes an electric power within a range of an upper limit performance and an upper limit power consumption of a power state set for the component among a plurality of power states corresponding to a type of the component,
      the at least one processor executes a server VM and a storage VM, the server VM being a VM that issues an I/O request, the storage VM being a VM that performs I/O of data of an I/O target in response to the I/O request with respect to the at least one storage device, and
   the electric power control method
      (A) determines whether a budget power as a power consumption permitted for a target computer is equal to or more than a power consumption of the target computer or not,
   the target computer being a computer as a power adjustment target among the plurality of computers, and
      (B) when a determination result of (A) is false, for at least one storage device of the target computer, selects a power state as power state of the at least one storage device, the power state being based on at least one of a priority of an operation using the at least one storage device and a data characteristic corresponding to the at least one storage device among a plurality of types of power states corresponding to a type of the at least one storage device,
      (C) determines whether the budget power is equal to or more than a power consumption after (B) for the target computer or not,
      (D) when a determination result at (C) is false, for at least one processor of the target computer, selects a power state as power state of the at least one processor, the power state being based on a priority of an operation that uses the at least one processor among a plurality of types of power states corresponding to the at least one processor,
      (E) determines whether the budget power is equal to or more than a power consumption after (D) or not for the target computer, and
      (F) when a determination result at (E) is false, for at least one component of the target computer, selects a power state among a plurality of types of power states corresponding to a type of the at least one component as power state of the at least one component based on a shortage in electric power of the target computer and a whole excessive power of the plurality of the computers,
   wherein the shortage in electric power of the target computer is a difference between a budget power of the target computer and a power consumption after (D) for the target computer,
   wherein the whole excessive power is a total of a plurality of excessive powers corresponding to the plurality of respective computers, and
   wherein for each of the plurality of computers, an excessive power is a difference between a budget power of the computer and a power consumption of the computer.

* * * * *